Aug. 27, 1968 — E. A. REDMER — 3,398,608
AUTOMATIC MACHINE TOOL
Filed Dec. 20, 1965 — 3 Sheets-Sheet 1
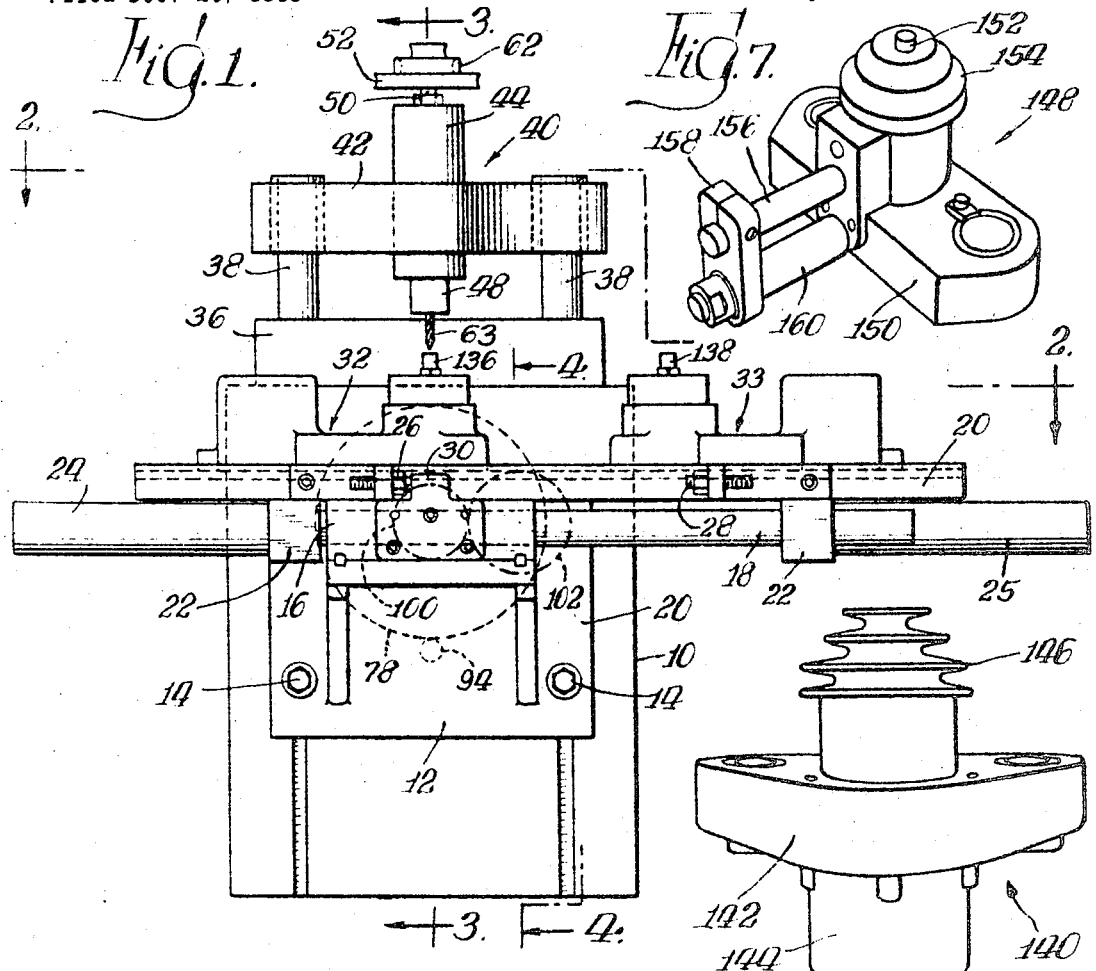
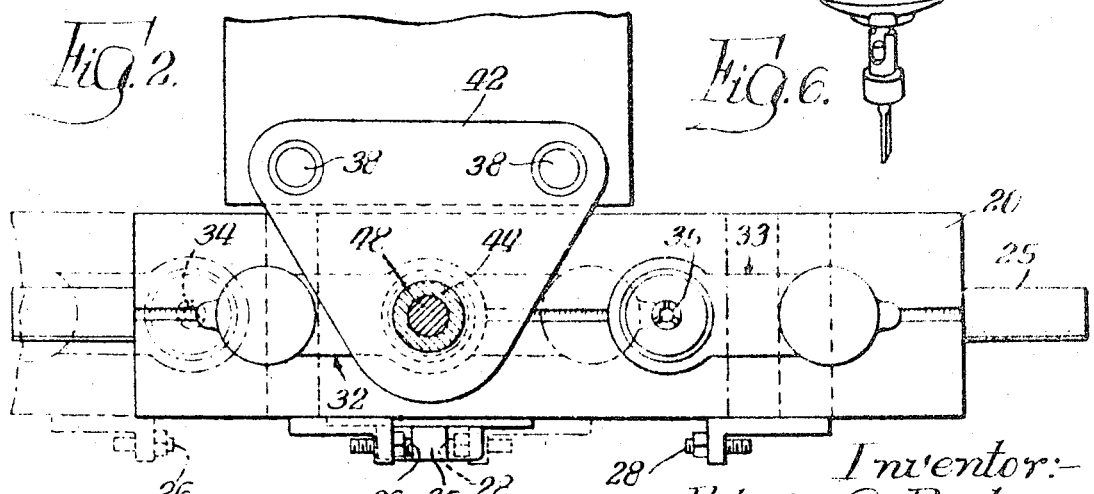
Inventor:
Edwin A. Redmer,
By Brown, Jackson, Boettcher & Dienner
Attys Aug. 27, 1968     E. A. REDMER     3,398,608
AUTOMATIC MACHINE TOOL
Filed Dec. 20, 1965     3 Sheets-Sheet 2
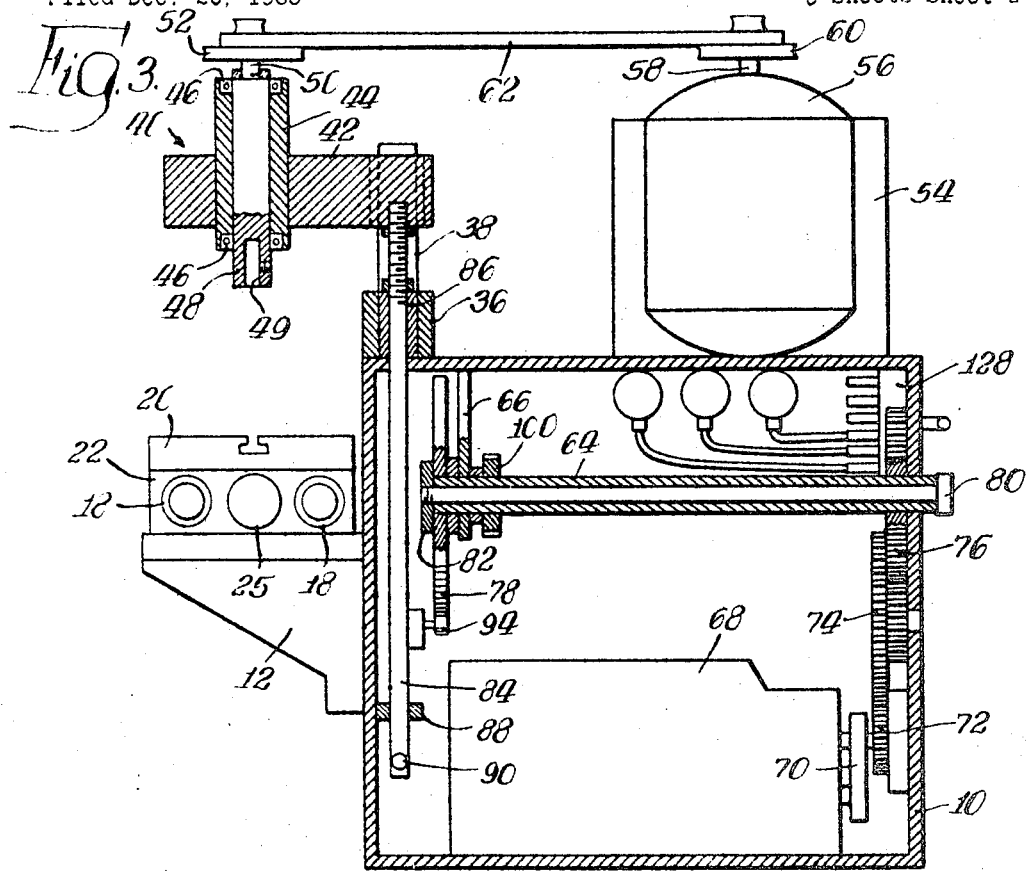
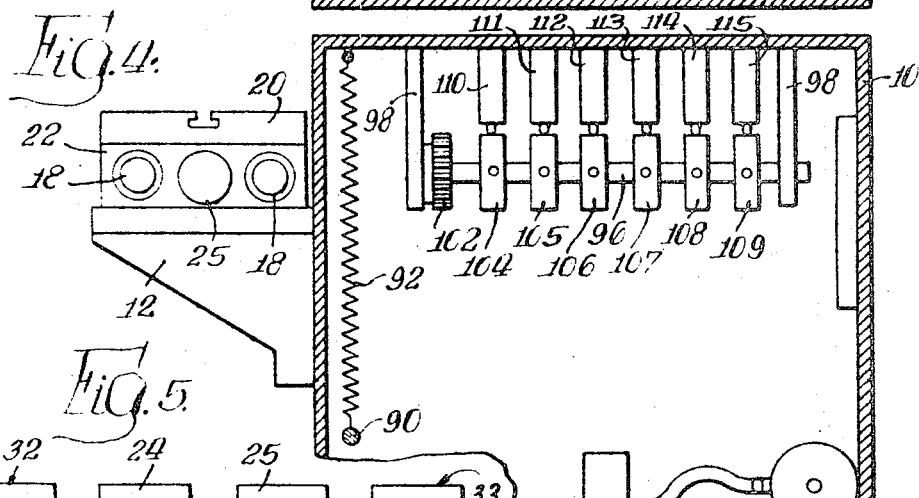
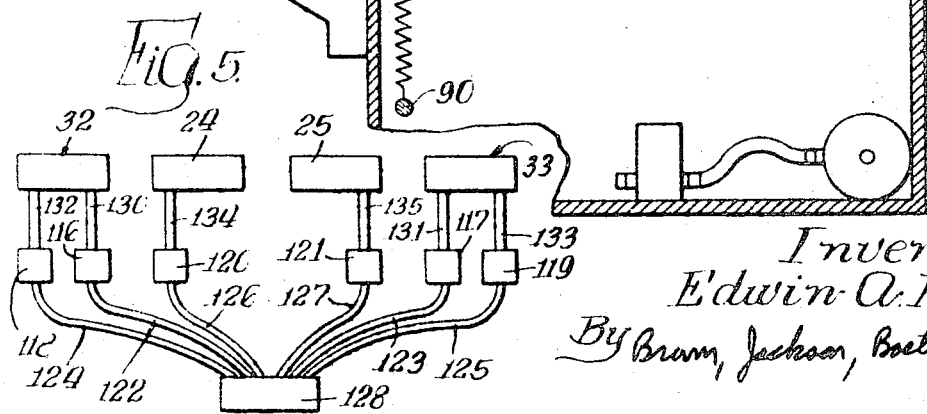
Inventor:—
Edwin A. Redmer,
By Brown, Jackson, Boettcher & Dienner
Attys.

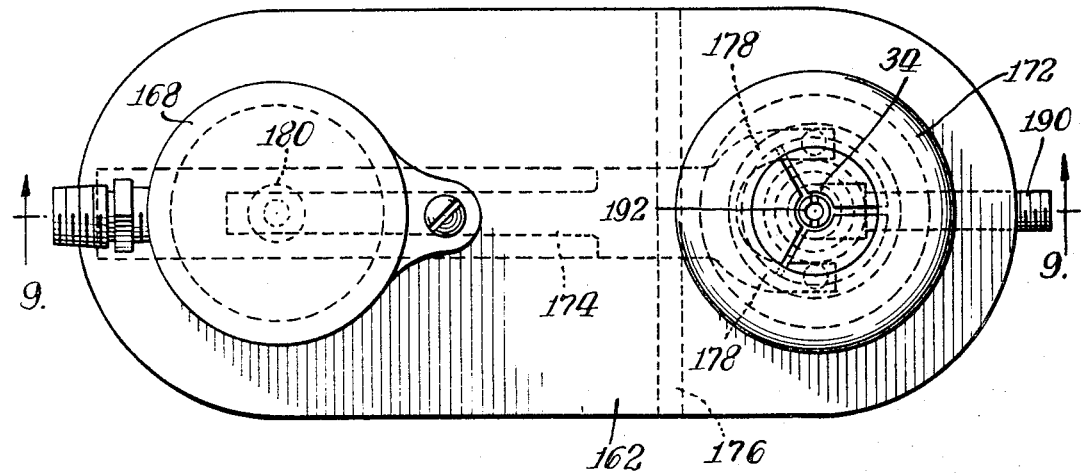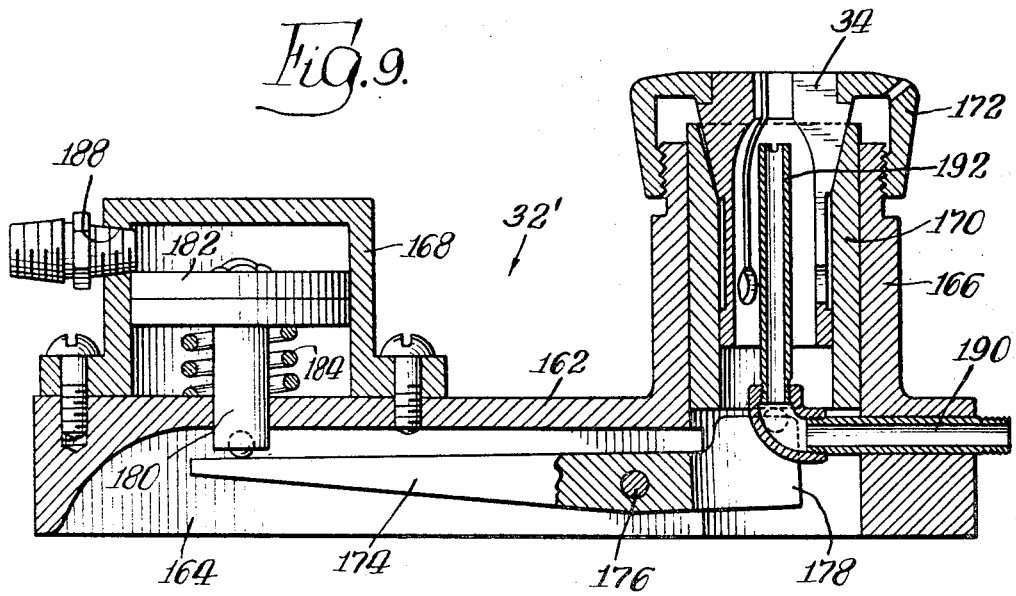

United States Patent Office 3,398,608
Patented Aug. 27, 1968

3,398,608
AUTOMATIC MACHINE TOOL
Edwin A. Redmer, Clearwater, Fla., assignor to Redmer Air Devices, Inc., St. Petersburg, Fla., a corporation of Florida
Filed Dec. 20, 1965, Ser. No. 515,031
12 Claims. (Cl. 77—5)

ABSTRACT OF THE DISCLOSURE

A machine tool having vertical post means, and a machine tool attachment housing slidably mounted on the post means. A vertical draw rod is secured to the attachment housing, and means are provided for effecting vertical movement of the draw rod and the attachment housing relative to the post means. A work table is movable transversely of the attachment housing and has mounted thereon pneumatically operated fixtures with collets for holding work pieces. Cam operated switches are arranged for cyclical actuation for controlling valves in pneumatic circuits effective in the automatic operation of the machine tool.

My present invention relates to a machine tool wherein a work piece, automatically, is gripped in a collet, moved to a work station where a machining operation is performed, moved away from the work station, and ejected from the collet. Preferably, two work holding collets are provided whereby one collet may be loaded with a work piece while a machining operation is being performed on a work piece in the other collet. In addition, the machine tool is arranged to receive interchangeably any one of a number of different machine tool attachments whereby drilling, tapping and threading, or milling of the work piece may be effected at the work station.

Now in order to acquaint those skilled in the art with the manner of constructing and using automatic machine tools in accordance with the principles of my present invention, I shall describe in connection with the accompanying drawings preferred embodiments of my invention.

In the drawings:

FIGURE 1 is a front elevational view of an automatic machine tool, with a drill head attachment, incorporating the principles of my present invention;

FIGURE 2 is a fragmentary view of the automatic machine tool of FIGURE 1, taken substantially along the line 2—2 in FIGURE 1, looking in the direction indicated by the arrows;

FIGURE 3 is a sectional view, with certain parts removed, taken substantially along the line 3—3 in FIGURE 1, looking in the direction indicated by the arrows;

FIGURE 4 is a sectional view, with certain parts removed, taken substantially along the line 4—4 in FIGURE 1, looking in the direction indicated by the arrows;

FIGURE 5 is a schematical view of the pneumatic control system incorporated in the automatic machine tool of FIGURE 1;

FIGURE 6 is a perspective view of a tapping and threading attachment for use in the automatic machine tool of FIGURE 1;

FIGURE 7 is a perspective view of a milling head attachment for use in the automatic machine tool of FIGURE 1;

FIGURE 8 is a plan view, on an enlarged scale, of a pneumatically operated fixture; and FIGURE 9 is a sectional view of the fixture of FIGURE 8, taken substantially along the line 9—9 in FIGURE 8, looking in the direction indicated by the arrows.

Referring now to FIGURES 1-4, I shall describe the automatic machine tool of my present invention which includes a main housing 10. Arranged at the front wall of the housing 10 is a mounting bracket or knee 12 which is vertically adjustable relative to the housing and which is adapted to be locked to the housing by bolts 14. Secured to the mounting bracket 12 is a saddle 16 which carries a pair of laterally spaced transversely extending stationary rods 18. Overlying the rods 18 is a transversely movable work table 20 having depending blocks 22 slidably supported on the rods 18. Longitudinally aligned intermediate of the rods 18 are a pair of pneumatic piston and cylinder assemblies 24 and 25. The cylinders of the assemblies 24 and 25 are suitably secured to the work table 20, and the piston rods (not shown), which extend from the inner ends of the cylinders, are connected to the mounting bracket 12.

Admission of air under pressure into the outer end of the pneumatic assembly 24 serves to distend the associated piston rod to effect movement of the work table 20 in one direction, while admission of air under pressure into the outer end of the pneumatic assembly 25 serves to distend the piston rod of that assembly to effect movement of the work table 20 in the other direction. The work table 20 may thus be oscillated back and forth as will be explained more fully hereinafter. To control the length of stroke of the table 20, the forward edge thereof is provided with adjustable stops 26 and 28 which are engageable with the opposite sides of a projection 30 forming part of the saddle 16. Mounted on the work table 20 are a pair of pneumatically operated fixtures 32 and 33 of the type, for example, disclosed in United States Patent 2,338,060. The fixtures 32 and 33 respectively have vertically disposed collets 34 and 35 for holding work pieces.

The afore-mentioned fixtures 32 and 33, which are identical in construction and operation, may be of an embodiment 32' as shown in FIGURES 8 and 9. The fixture 32' includes a base 162 having a hollow underside 164, an upstanding chuck casing 166 and an upstanding fluid cylinder 168. Slidably mounted in the chuck casing 166 is a collet actuating sleeve 170 which receives the collet 34, and threaded on the upper end of the chuck casing 166 is a collet retaining nose piece 172. Arranged within the hollow underside 164 of the base 162 is a lever 174 pivotally mounted intermediate of its ends at 176. One end of the lever 174 is bifurcated to provide a pair of arms 178 which engage the lower end of the sleeve 170, while the other end of the lever 174 is engaged by the piston stem 180 of a piston 182 slidable in the fluid cylinder 168. A coil spring 184 serves to bias the piston 182 upwardly, and the cylinder 168 is provided with an opening 188 through which fluid under pressure may be admitted to and exhausted from the internal cylinder area above the piston 182. Upon admission of fluid under pressure to the cylinder 168, the piston 182 is caused to move downwardly whereby the lever 174 is pivoted causing the sleeve 170 to move upwardly to close the jaws of the collet 34. Upon the release of fluid pressure, the spring 184 causes the piston 182 to rise, thereby releasing the pressure on the lever 174 whereupon the sleeve 170 is permitted to move downwardly under its own weight combined with the spring tension of the collet jaws to allow opening of the jaws. Mounted in the base 162 is a horizontal hollow rod 190 which supports an adjustable vertical hollow stop rod 192. Air under pressure is adapted to be directed through the hollow rods 190 and 192 for ejecting a work piece from the collet when the jaws of the latter are opened.

supplied through the hose 131 to the fixture 33 for ejecting the work piece 138 from the collet 35. In addition, the valve 118 is again opened and air under pressure is directed to the collet 34 for closing the same on the work piece therein. Thereafter, the table control valve 121 and the ejection valve 117 are closed, and the above-described sequence of operations is repeated. As will be appreciated, the foregoing cyclical operations, by which cam operated switches control valves in pneumatic circuits, provide for automatic operation of the machine, except in respect to the manual placement of the work pieces within the collets 34 and 35. The shape of the main cam 78 determines the depth of the hole formed by the drill 63, and other main cams with different shapes may be used interchangeably with the main cam 78 shown when different depths of holes are desired.

When it is desired to effect tapping and threading with my automatic machine tool, the drill head attachment 40 may be removed from the post members 38 and replaced with a tapping and threading attachment 140 shown in FIGURE 6. The attachment 140 comprises a housing 142 adapted to be mounted on the post members 38, a vertically disposed tapping and threading unit 144 secured in the housing 142, and a multiple step pulley 146 connected to the upper end of the tapping and threading unit 144 and arranged to receive the belt 62. Except for a change in the main cam 78, vertical movement of the tapping and threading attachment 140, and transverse movement of the work table 20, is automatically controlled in the same manner described above in connection with the use of the drill head attachment 40.

The automatic machine tool of my present invention may also be used with a milling head attachment 148 shown in FIGURE 7. The attachment 148 includes a housing 150 which is adapted to be mounted on the post members 38. A vertical main spindle 152 is rotatably mounted in the housing 150 and has secured to its upper end a multiple step pulley 154. Projecting forwardly from the housing 150 is a horizontal arbor support arm 156, and carried at the outer end thereof is an arbor support plate 158. A horizontal arbor spindle 160, on which milling cutters may be suitably secured, is rotatably mounted at one end in the housing 150 and at the other end in the arbor support plate 158. Within the housing 150, the main spindle 152 and the arbor spindle 160 are drivingly interconnected as by means of bevel gears. Movement of the milling head attachment 148 and work table 20 are automatically controlled in substantially the same manner as the drill head attachment 40. The principal difference is in the provision of two Bellows hydro-checks which control correct surface feed of the work piece to the milling cutters in the final stroke of the work table 20.

While I have shown and described what I believe to be preferred embodiments of my present invention, it will be understood by those skilled in the art that various rearrangements and modifications may be made therein without departing from the spirit and scope of my invention.

I claim:
1. An automatic machine tool comprising a main housing, vertical post means secured to and extending upwardly from said main housing and being unobstructed at the upper end thereof, a machine tool attachment housing slidably mounted on said post means, a vertical draw rod mounted for vertical movement relative to said main housing, said draw rod at its upper end being releasably secured to said attachment housing and at its lower end projecting into said main housing, and means for effecting vertical movement of said draw rod whereby to effect vertical movement of said attachment housing relative to said post means.

2. The apparatus of claim 1 wherein said means for effecting vertical movement of said draw rod comprises a horizontal main shaft in said main housing, means for rotating said main shaft, a main cam secured to said main shaft, a cam follower carried by said draw rod and engageable with the periphery of said main cam, and said main cam upon rotation serving to effect cyclical vertical downward movement of said cam follower and said draw rod.

3. The apparatus of claim 2 including spring means for biasing said draw rod vertically upwardly and maintaining said cam follower in engagement with the periphery of said main cam.

4. The apparatus of claim 3 including a first gear secured to said main shaft, a horizontal countershaft, a second gear secured to said countershaft and meshing with said first gear, a plurality of secondary cams secured to said countershaft, and a plurality of switches arranged adjacent said secondary cams for cyclical actuation thereby during rotation of said secondary cams for controlling valves in pneumatic circuits effective in the automatic operation of said machine tool.

5. An automatic machine tool comprising a main housing, vertical post means secured to and extending upwardly from said main housing, a machine tool attachment housing mounted on said post means, a vertical draw rod mounted for vertical movement relative to said main housing, said draw rod at its upper end being secured to said attachment housing and at its lower end projecting into said main housing, a horizontal main shaft in said main housing, means for rotating said main shaft, a main cam secured to said main shaft, a cam follower carried by said draw rod and engageable with the periphery of said main cam, said main cam upon rotation serving to effect cyclical vertical downward movement of said cam follower and said draw rod whereby to effect vertical movement of said attachment housing relative to said post means, spring means for biasing said draw rod vertically upwardly and maintaining said cam follower in engagement with the periphery of said main cam, a work table movable transversely of said main housing, pneumatic assembly means for effecting transverse movement of said work table, pneumatically operated fixtures mounted on said work table and having collets for holding work pieces, a first gear secured to said main shaft, a horizontal countershaft, a second gear secured to said countershaft and meshing with said first gear, a plurality of secondary cams secured to said countershaft, a plurality of switches arranged adjacent said secondary cams for cyclical actuation thereby during rotation of said secondary cams for controlling valves in pneumatic circuits which effect in predetermined sequence actuation of said pneumatic assembly means for moving said work table, closing of said collets for gripping work pieces, and ejection of work pieces from said collets.

6. An automatic machine tool comprising a main housing, vertical post means secured to and extending upwardly from said main housing, a machine tool attachment housing mounted on said post means, a vertical draw rod mounted for vertical movement relative to said main housing, said draw rod at its upper end being secured to said attachment housing and at its lower end projecting into said main housing, a horizontal main shaft in said main housing, an electric motor within said main housing for rotating said main shaft, power transmission means within said main housing interconnecting said electric motor and said main shaft, a main cam secured to said main shaft, a cam follower carried by said draw rod and engageable with the periphery of said main cam, said main cam upon rotation serving to effect cyclical vertical downward movement of said cam follower and said draw rod whereby to effect vertical movement of said attachment housing relative to said post means, spring means for biasing said draw rod vertically upwardly and maintaining said cam follower in engagement with the periphery of said main cam, a first gear secured to said main shaft, a horizontal countershaft, a second gear secured to said countershaft and meshing with said first gear, a plurality of secondary cams secured to said countershaft, and a plurality of switches arranged adjacent said secondary cams for cyclical actuation thereby during rotation of said secondary cams for controlling valves in pneumatic circuits effective in the automatic operation of said machine tool.

7. For use in an automatic machine tool having a main housing, a work table movable transversely of the main housing, pneumatic assembly means for effecting transverse movement of the work table, and pneumatically operated fixtures mounted on the work table and having collets for holding work pieces, the combination of a horizontal countershaft in the main housing, means for rotating said countershaft, a plurality of cams secured to said countershaft, and a plurality of switches arranged adjacent said cams for cyclical actuation thereby during rotation of said cams for controlling valves in pneumatic circuits which effect in predetermined sequence actuation of said pneumatic assembly for moving the work table, closing of the collets for gripping work pieces, and ejection of work pieces from the collets.

8. For use in an automatic machine tool having a main housing, a work table movable transversely of the main housing, pneumatic assembly means for effecting transverse movement of the work table, and pneumatically operated fixtures mounted on the work table and having collets for holding work pieces, the combination of a horizontal countershaft in the main housing, a horizontal main shaft in the main housing, a first gear secured to said main shaft, a second gear secured to said countershaft and meshing with said first gear means for rotating said main shaft, a plurality of cams secured to said countershaft, and a plurality of switches arranged adjacent said cams for cyclical actuation thereby during rotation of said cams for controlling valves in pneumatic circuits effective in the automatic operation of said machine tool.

9. The apparatus of claim 8 wherein said means for rotating said main shaft comprises an electric motor within the main housing, and power transmission means within the main housing interconnecting said electric motor and said main shaft.

10. The apparatus of claim 1 including a vertical drill spindle rotatably mounted in said attachment housing, and power means for rotating said drill spindle.

11. The apparatus of claim 1 including a vertically disposed tapping and threading unit secured in said attachment housing, and power means for operating said tapping and threading unit.

12. A machine tool comprising a main housing, a pair of transversely spaced vertical post members secured to and extending upwardly from said main housing, a machine tool attachment housing mounted on said post members, a vertical main spindle rotatably mounted in said attachment housing, power means carried by said main housing for rotating said main spindle, a horizontal arbor support arm projecting forwardly from said attachment housing, an arbor support plate carried at the outer end of said arbor support arm, a horizontal arbor spindle extending in a plane perpendicular to the plane of said post members and being rotatably mounted at one end in said attachment housing and at the other end in said arbor support plate, and means drivingly interconnecting said main spindle and said arbor spindle.

References Cited
UNITED STATES PATENTS

| 1,139,422 | 5/1915 | Johnson | 90—164 |
| 1,623,346 | 4/1927 | Johnson | 90—164 |
| 1,690,541 | 11/1928 | Kuzelewski | 10—139 |
| 2,338,060 | 12/1943 | Redmer | 279—4 |
| 2,396,642 | 3/1946 | Davis | 77—32 |
| 2,671,233 | 3/1954 | Marchant et al. | 77—6 |
| 3,077,128 | 2/1963 | Brown | 77—5 |
| 3,099,873 | 8/1963 | Brainard et al. | 29—26 |
| 3,060,466 | 10/1962 | Kozacka | 77—33.5 |

FOREIGN PATENTS

| 129,295 | 10/1920 | Great Britain. |

FRANCIS S. HUSAR, *Primary Examiner.*